US008885462B2

(12) United States Patent
Kapadia et al.

(10) Patent No.: US 8,885,462 B2
(45) Date of Patent: Nov. 11, 2014

(54) FAST REPAIR OF A BUNDLED LINK INTERFACE USING PACKET REPLICATION

(75) Inventors: Shamit Dipak Kapadia, San Jose, CA (US); Zhifang Zeng, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 96 days.

(21) Appl. No.: 13/310,748

(22) Filed: Dec. 3, 2011

(65) Prior Publication Data

US 2013/0142036 A1    Jun. 6, 2013

(51) Int. Cl.
  H04J 3/14    (2006.01)
  G06F 11/00   (2006.01)
  H04L 12/28   (2006.01)
  H04L 12/56   (2006.01)
  G06F 15/173  (2006.01)

(52) U.S. Cl.
  USPC ......... 370/228; 370/218; 370/230; 370/236; 370/389; 370/394; 709/225

(58) Field of Classification Search
  USPC ............ 370/218, 229, 230, 236, 389, 394; 709/225
  See application file for complete search history.

(56) References Cited

U.S. PATENT DOCUMENTS

| 7,310,306 | B1 | 12/2007 | Cheriton |  |
|---|---|---|---|---|
| 8,385,208 | B1* | 2/2013 | Medina | 370/236 |
| 8,619,568 | B2 | 12/2013 | Ding et al. |  |
| 2005/0071469 | A1* | 3/2005 | McCollom et al. | 709/225 |
| 2005/0243716 | A1* | 11/2005 | Bitar et al. | 370/218 |
| 2005/0259646 | A1* | 11/2005 | Smith et al. | 370/389 |
| 2006/0221974 | A1* | 10/2006 | Hilla et al. | 370/394 |
| 2007/0121499 | A1* | 5/2007 | Pal et al. | 370/230 |
| 2007/0223372 | A1* | 9/2007 | Haalen et al. | 370/229 |
| 2012/0201135 | A1* | 8/2012 | Ding et al. | 370/230.1 |

OTHER PUBLICATIONS

Karan et al., "Multicast only Fast Re-Route," Mar. 2, 2009, draft-karan-mofrr-00, The Internet Society, Reston, VA, USA (thirteen pages).

Karan et al., "Multicast only Fast Re-Route," Mar. 13, 2011, draft-karan-mofrr-01, The Internet Society, Reston, VA, USA (fourteen pages).

* cited by examiner

*Primary Examiner* — Jung Park
*Assistant Examiner* — Chuong M Nguyen
(74) *Attorney, Agent, or Firm* — The Law Office of Kirk D. Williams

(57) ABSTRACT

In one embodiment, a packet switching device sends packets to be sent from a single link of a bundled link interface to multiple egress network processing units (on a same or different line cards). A single one of these multiple egress network processing units is configured to be in the active mode sending particular sets of packets. The other egress network processing units are configured for these particular sets of packets to be in the non-active mode, and hence, will correspondingly drop these particular sets of packets. In case of failure, an egress network processing unit can quickly (e.g., changing a flag) be changed to the active mode to quickly reduce or eliminate loss of packets.

20 Claims, 6 Drawing Sheets

FAST REPAIR OF A BUNDLED LINK INTERFACE USING PACKET REPLICATION

TECHNICAL FIELD

The present disclosure relates generally to communicating information over a network between two networked devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Reliably communicating information in a network is important. Different techniques are employed, including those included in a protocol used to communicate packets, as well as path protection for being able to quickly reroute traffic when a particular path no longer becomes available.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1A:
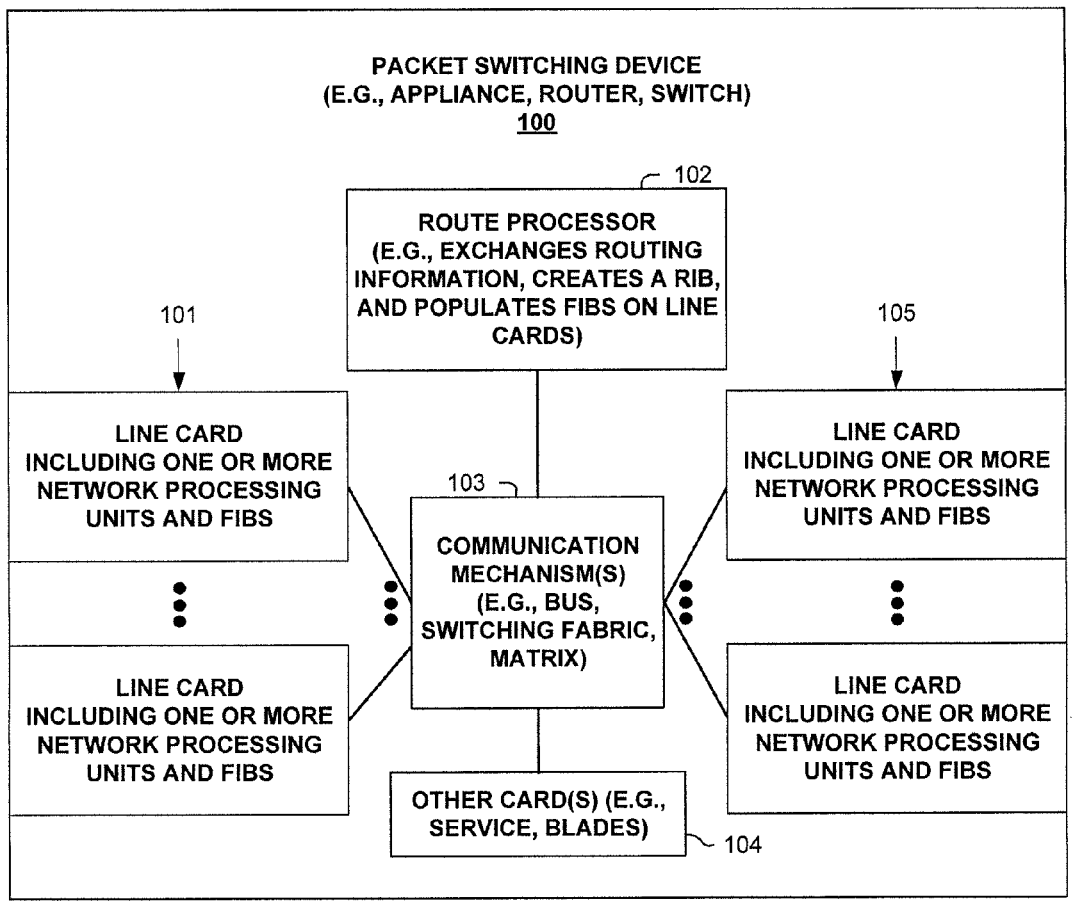
FIG. 1A illustrates a packet switching device configured to operate, and/or operating, according to one embodiment.

Disclosed are, inter alia, methods, apparatus, computer-storage media, mechanisms, and means associated with fast repair of a bundled link interface using packet replication. One embodiment includes an apparatus, such as, but not limited to, a packet switching device (e.g., router, switch, bridge), networked appliance, or networked host device.

One embodiment includes: communicating a particular packet, that is to be sent out over a bundled interface of a packet switching device, to each of two of a plurality of egress network processing units associated with one or more links of a plurality of links, with the bundled interface associated with a set of links including the plurality of links; and in response to determining by each particular egress network processing unit of one or more particular egress network processing units of the plurality of egress network processing units that said particular egress network unit is in the non-active state for communicating the particular packet from the bundled interface, dropping the particular packet; and in response to determining by a single egress network processing unit of the plurality of egress network processing units that the single egress network processing unit is in the active state for communicating the particular packet from the bundled interface, forwarding the particular packet from the packet switching device over a particular link of the plurality of links of the bundled interface; wherein the particular packet is sent out over a single link of the plurality of links of the bundled interface.

In one embodiment, the plurality of egress network processing units includes at least three egress network processing units; and wherein one or more particular egress network processing units includes at least two of the plurality of egress network processing units. In one embodiment, in response to determining that the particular link is not available for communicating packets, the single egress network processing unit providing notification to each of said one or more particular egress network processing units, and in response, each of said one or more particular egress network processing units to an active state for communicating packets from the bundled interface. In one embodiment, in response to determining that the single egress network processing unit is not available for communicating packets over the bundled interface, the packet switching device switches each of said one or more particular egress network processing units to an active state for communicating packets from the bundled interface.

One embodiment, includes: communicating a particular packet, that is to be sent out over a link of a plurality of links of a bundled link interface of a packet switching device, a copy of the particular packet to each of a plurality of egress network processing units associated with one or more links of the plurality of links; and in response to determining by each particular egress network processing unit of one or more particular egress network processing units of the plurality of egress network processing units that said particular egress network unit is in the non-active state for communicating the particular packet from the bundled link interface, dropping the particular packet; and in response to determining by a single egress network processing unit of the plurality of egress network processing units that the single egress network processing unit is in the active state for communicating the particular packet from the bundled link interface, forwarding the particular packet from the packet switching device over a particular link of the plurality of links of the bundled link interface; wherein the particular packet is sent out over a single link of the plurality of links of the bundled link interface.

In one embodiment, in response to determining that the particular link is not available for communicating packets, the single egress network processing unit providing notification to one egress network processing unit of said one or more particular egress network processing units, and in response, the one egress network processing unit switching to an active state for communicating packets from the bundled link interface. In one embodiment, in response to determining that the single egress network processing unit is not available for communicating packets over the bundled link interface, the packet switching device switching one egress network processing unit of said one or more particular egress network processing units to an active state for communicating packets from the bundled link interface.

In one embodiment, said determining by each particular egress network processing unit that said particular egress network unit is in the non-active state for communicating the particular packet from the bundled link interface includes performing a lookup operation on a forwarding data structure. In one embodiment, said performing the lookup operation on the forwarding data structure results in the identification of an entry corresponding to said particular egress network processing unit backup the single egress network processing unit, with the entry identifying to drop the particular packet. In one embodiment, wherein at the time of said dropping the particular packet: each particular egress network processing unit of said one or more particular egress network processing units is in the active state for communicating other packets from the bundled link interface. In one embodiment, at the time of said dropping the particular packet: the single egress network processing unit is in a non-active state for dropping a plurality of backup packets corresponding to the bundled link interface, with packets corresponding to the plurality of backup packets being sent from the bundle interface by another of said egress network processing unit of one or more particular egress network processing units.

In one embodiment, said determining by the single egress network processing unit that the single egress network processing unit is in the active state for communicating the particular packet from the bundled link interface includes performing a lookup operation on a forwarding data structure. In one embodiment, said performing the lookup operation on the forwarding data structure results in the identification of an entry corresponding to the single egress network processing unit in the active state, with the entry identifying to forward the particular packet.

In one embodiment, at the time of said dropping the particular packet: each particular egress network processing unit of said one or more particular egress network processing units is in the active state for communicating other packets from the bundled link interface. In one embodiment, at the time of said dropping the particular packet: the single egress network processing unit is in a non-active state for dropping a plurality of backup packets corresponding to the bundled link interface, with packets corresponding to the plurality of backup packets being sent from the bundle interface by another of said egress network processing unit of one or more particular egress network processing units.

In one embodiment, each of the plurality of egress network processing units are located on a different line card of the packet switching device. In one embodiment, the single egress interface is associated with a particular plurality of links of the plurality of links of the bundled link interface; and wherein the method includes the single egress interface load balancing packets over the particular plurality of links, which includes the single egress interface selecting the single link of the plurality of links of the bundled link interface. In one embodiment, the particular packet is a multicast packet; and wherein the method includes sending the particular packet from the packet switching device over a communications link that is not associated with the bundled link interface.

2. Description

Disclosed are, inter alia, methods, apparatus, computer-storage media, mechanisms, and means associated with fast repair of a bundled link interface using packet replication. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

One embodiment of packet switching device 100 (e.g., appliance, router, switch bridge) is illustrated in FIG. 1A. As shown, packet switching device 100 includes line cards 101 and 105, each with one or more network processing units and FIBs for use in forwarding packets. Additionally, packet switching device 100 also has a route processor 102, which typically manages the control plane by communicating routing information with other packet switching devices, populates one or more RIBs, and populates one or more FIBs in line cards 101 and 105. Line card 100 also includes other cards 104 (e.g., service cards, blades), and some communication mechanism 103 (e.g., bus, switching fabric, matrix) for allowing its different entities 101, 102, 104 and 105 to communicate.

Note, as used herein, a network processing unit refers to a network processor and memory for use in processing (e.g., including forwarding) of packets. A line card can have a single network processing unit, or may have multiple network processing units. In the particular context of a bundle interface associated with a network processing unit, a network processing unit is typically responsible for forwarding traffic over its own set of one or more links associated with the bundled link interface.

Figure 1B:
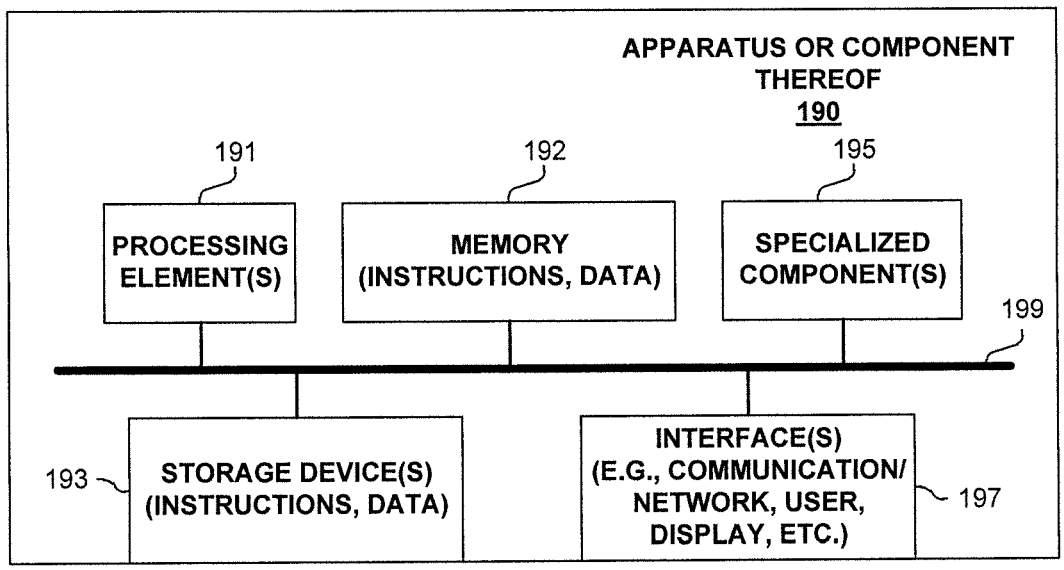
FIG. 1B illustrates an apparatus or component configured to operate, and/or operating, according to one embodiment.

FIG. 1B is a block diagram of an apparatus or component 190 used in one embodiment associated with reliably transporting a stream of packets using packet replication. In one embodiment, apparatus or component 190 performs one or more processes corresponding to one of the flow diagrams illustrated or otherwise described herein, and/or illustrated in another diagram or otherwise described herein.

In one embodiment, apparatus or component 190 includes one or more processing element(s) 191, memory 192, storage device(s) 193, specialized component(s) 195 (e.g. optimized hardware such as for performing operations, etc.), and interface(s) 197 for communicating information (e.g., sending and receiving packets, user-interfaces, displaying information, etc.), which are typically communicatively coupled via one or more communications mechanisms 199, with the communications paths typically tailored to meet the needs of a particular application. In one embodiment apparatus or component 190 corresponds to, or is part of, packet switching device 100 of FIG. 1, packet switching device 200 of FIG. 2.

Various embodiments of apparatus or component 190 may include more or fewer elements. The operation of apparatus or component 190 is typically controlled by processing element(s) 191 using memory 192 and storage device(s) 193 to perform one or more tasks or processes. Memory 192 is one type of computer-readable/computer-storage medium, and typically comprises random access memory (RAM), read only memory (ROM), flash memory, integrated circuits, and/or other memory components. Memory 192 typically stores computer-executable instructions to be executed by processing element(s) 191 and/or data which is manipulated by processing element(s) 191 for implementing functionality in accordance with an embodiment. Storage device(s) 193 are another type of computer-readable medium, and typically comprise solid state storage media, disk drives, diskettes, networked services, tape drives, and other storage devices. Storage device(s) 193 typically store computer-executable instructions to be executed by processing element(s) 191 and/or data which is manipulated by processing element(s) 191 for implementing functionality in accordance with an embodiment.

Figure 2:
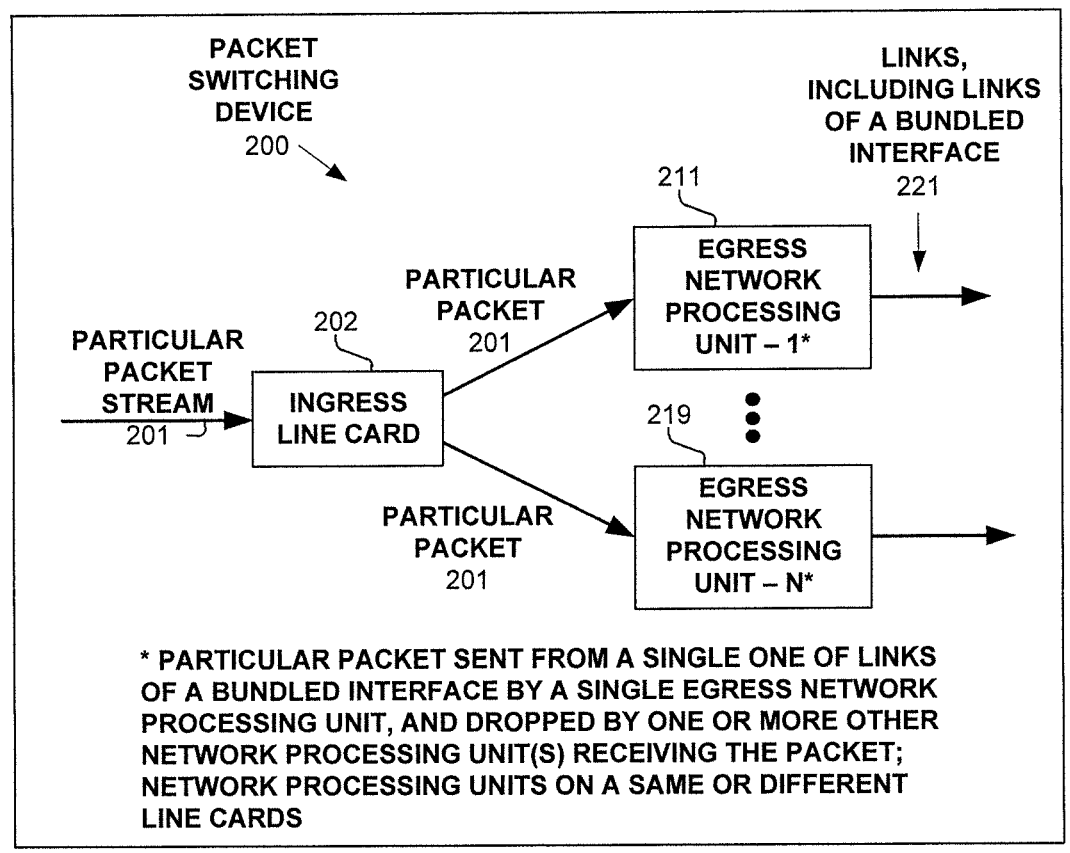
FIG. 2 illustrates a packet switching device configured to operate, and/or operating, according to one embodiment.

FIG. 2 illustrates the operation of packet switching device 200 of one embodiment. As shown, a packets of a particular packet stream 201 are received by ingress line card 202 from another network device. Ingress line card 202 performs a forwarding look operation on a received particular packet 201 to determine how to forward particular packet 201. In this example, particular packet 201 is to be forwarded out a single link of the multiple links (221) of a bundled link interface (also referred to as a bundled interface).

For, inter alia, fast repair of the bundled link interface in one embodiment, ingress line card 202 is configured to send a copy of each particular packet 201 to two of multiple egress network processing units (211-219). A priori, a single one of these two multiple egress network processing units (211-219) has been configured (typically, automatically configured) to be in the active state for forwarding a particular packet 201 from packet switching device 200 over a link 221 of the bundled link interface; while the other egress network processing units of the multiple egress network processing units (211-219) (typically all, but at least that one that will receive a copy of particular packet 201) are configured to be in a non-active state for forwarding a particular packet 201 (hence, will drop it and not send out a link 221). In case of a failure (or degradation, maintenance, etc.) of the link of the bundled interface that is currently being used for sending particular packets 201, packet switching device 200 automatically sets all of the other egress network processing units of the multiple egress network processing units (211-219) to be in the active state; and hence the single one of the other egress network processing units that is receiving particular packets 201 will now forward particular packets 201 over one of the links 221 of the bundled interface (instead of dropping them, as previously configured). Thus, an egress network processing unit (211-219) in the non-active state that is receiving particular packet 221 can be quickly reconfigured to be in the corresponding active state thus limiting the amount of traffic that is lost due to the detected condition. Note, multiple egress network processing units (211-219) can be on a same different line card, on different line cards, or on some combination thereof. Also, in one embodiment, in response to a detected failure of being able to send out packets over a link of the bundled interface, the single one of these two multiple egress network processing units (211-219) will send a notification of the other egress network processing units (211-219) causing them to switch to the active mode for sending particular packets 201. As only a single one of these the other egress network processing units (211-219) is receiving a copy of each particular packet 201, only a single copy of each particular packet 201 will be sent from packet switching device 200 over the bundled interface.

For, inter alia, fast repair of the bundled link interface in one embodiment, ingress line card 202 sends a copy of each particular packet 201 to each of multiple egress network processing units (211-219). A priori, a single one of multiple egress network processing units (211-219) has been configured (typically, automatically configured) to be in the active state for forwarding particular packet 201 from packet switching device 200 over a link 221 of the bundled link interface; while the other egress network processing units of the multiple egress network processing units (211-219) (at least those that will receive a copy of particular packet 201) are configured to be in a non-active state for forwarding particular packet 201 (hence, will drop it and not send out a link 221). In case of a failure (or degradation, maintenance, etc.) of a link of the bundled interface, packet switching device 200 automatically switches a different one of multiple egress network processing units (211-219) that is currently receiving and dropping particular packet 201 to become in the active state; and hence will forward packet 201 over one of the links 221 of the bundled interface. In one embodiment, this notification is initiated and/or performed by the egress network processing unit (211-219) that was previously forwarding particular packets 201. Thus, an egress network processing unit (211-219) in the non-active state that is receiving particular packet 221 can be quickly reconfigured to be in the corresponding active state thus limiting the amount of traffic that is lost due to the detected condition. Note, multiple egress network processing units (211-219) can be on a same different line card, on different line cards, or on some combination thereof.

In one embodiment, the bundled link interface operates at the link layer and appears to upper layer protocols as a single logical link. In one embodiment, the bundled link interface is assigned a single Internet Protocol (IP) address for use as the source address for IP packets to be sent from the bundled link interface and for use as a destination address of IP packets to be received on the bundled link interface. In one embodiment, the bundled link interface is configured to perform link layer failure detection and to remove a link from the plurality of bundled communication links in response to a detected link layer failure of the link.

Figure 3:
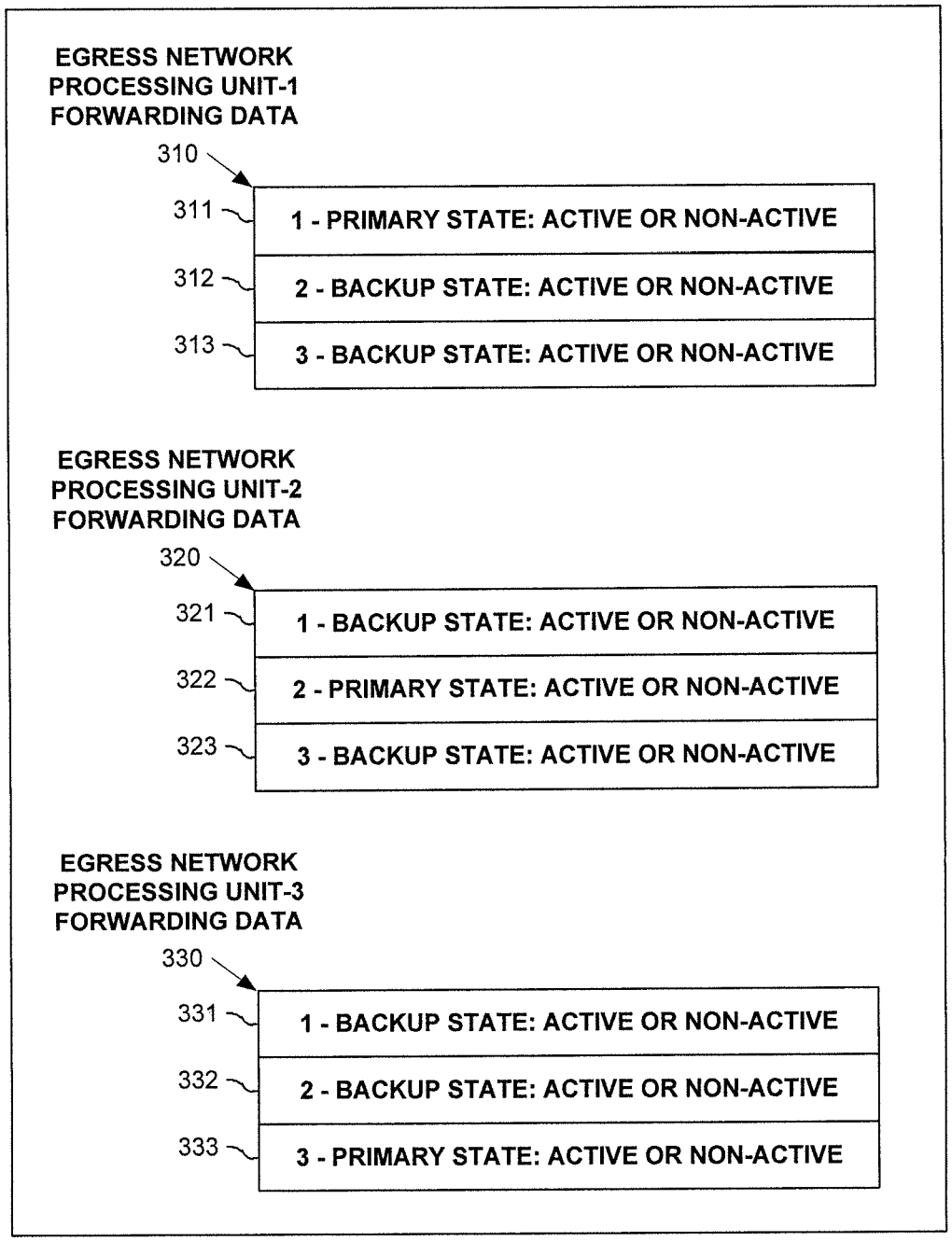
FIG. 3 illustrates one or more data structures used in one embodiment.

FIG. 3 illustrates forwarding data structures 310, 320, and 330 used in one embodiment. Of course there are an unlimited number of different data structures and ways to achieve fast recover. In one embodiment, three egress network processing units are employed in sending traffic over a bundled link interface. Simple three-entry data structures 310, 320, 330 can be used in keeping track of the active or non-active state of a portion of the traffic being sent over the bundled link interface. Typically, traffic is being sent over each link of the bundled link interface (e.g., a link is not simply a protection link, but is constantly in use). So, one embodiment includes in a leaf node (or some other result position or register) of a data structure 310, 320, 330 which includes a flag or other value designating whether the entry corresponds to an active or non-active state.

In one embodiment: a single one entry 311, 321 and 331 designates a corresponding active state, while the other two entries 311, 321 and 331 designate a corresponding non-active state; a single one entry 312, 322 and 332 designates a corresponding active state, while the other two entries 312, 322 and 332 designate a corresponding non-active state; and a single one entry 313, 323 and 333 designates a corresponding active state, while the other two entries 313, 323 and 333 designate a corresponding non-active state. Thus, if lookup operations for a same packet on each of the three different egress network processing units will retrieve the result from a same position in data structures 310, 320 and 330, then only a single egress network processing unit will determine the active state for the packet, and the other egress network processing units will determine the non-active state for the packet.

Figure 4:
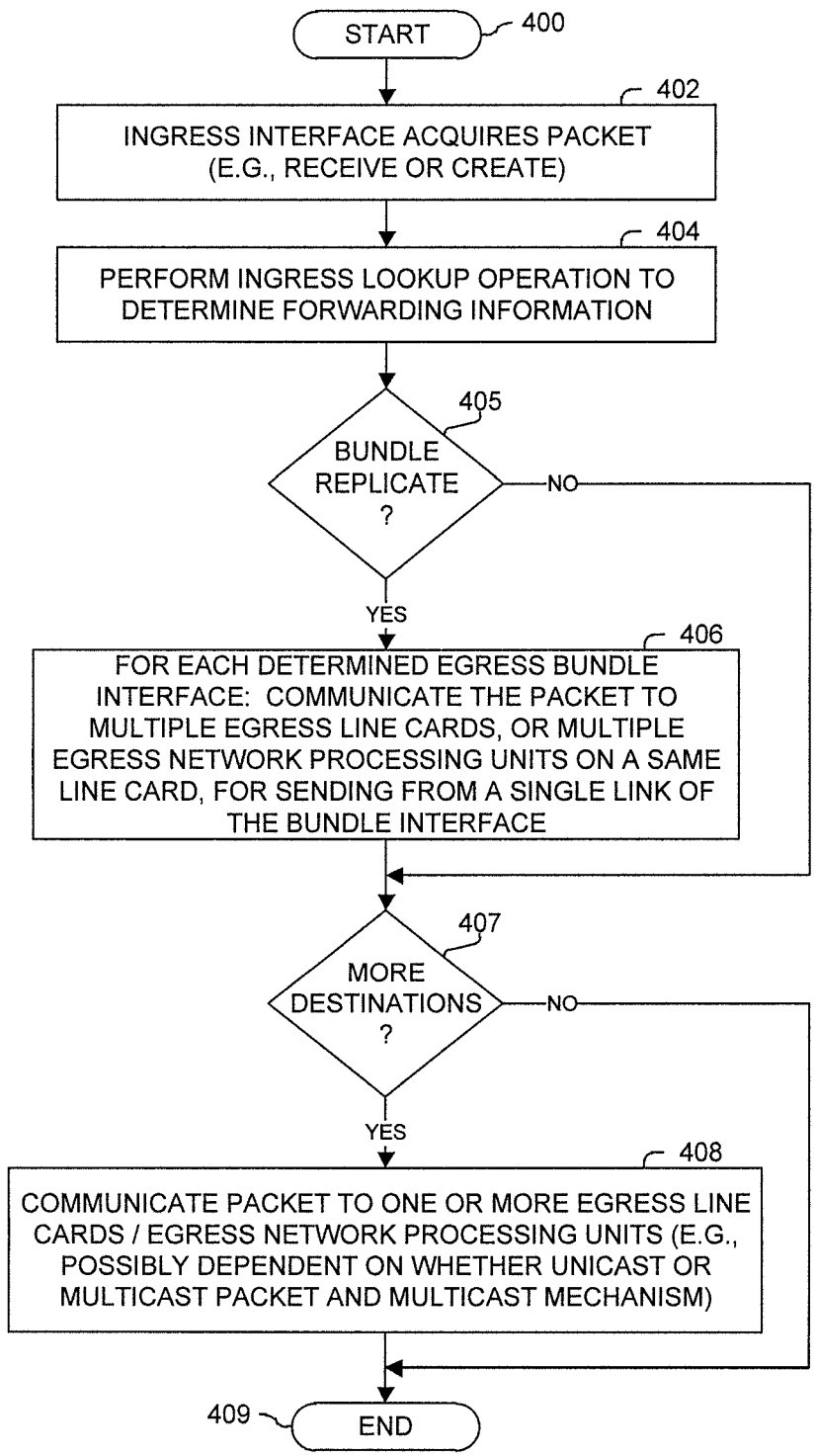
FIG. 4 illustrates a processes configured to be performed, and/or performed, in one embodiment.

FIG. 4 illustrates a processes configured to be performed, and/or performed, in one embodiment. Processing begins with process block 400. In process block 402, an ingress interface (e.g., line card) acquires a packet (e.g., receives from a different network node, or is created by the packet switching device). In process block 404, an ingress lookup operation is performed on the received packet. As determined in process block 405, if the packet is to be sent out of a bundled link interface that is using packet replication for fast recovery, then processing proceeds to process block 406, otherwise directly to process block 407. In process block 406, for each determined egress bundle interface to send the packet: communicate the packet to multiple egress line cards, or multiple egress network processing units on a same line card, for sending from a single link of the bundle interface. In one embodiment, the packet is sent to two egress line cards or two egress network processing units on a same line card with one set in the active mode corresponding to the packet and one set in the non-active mode corresponding to the packet. Typically, there would be a single determined bundled interface. However, for a broadcast or multicast packet, it is possible that the packet is to be sent out multiple bundled interfaces.

In process block 407, a determination is made to see if there are more links from which the particular packet is to be sent (e.g., over one or more links not associated with a bundled link interface). If so, then in process block 408, the packet is communicated to one or more egress line cards/egress network processing units (e.g., possibly dependent on whether it is a unicast packet, or multicast packet and the packet switching device's multicast mechanism). Processing of the flow diagram of FIG. 4 is complete as indicated by process block 409.

Figure 5:
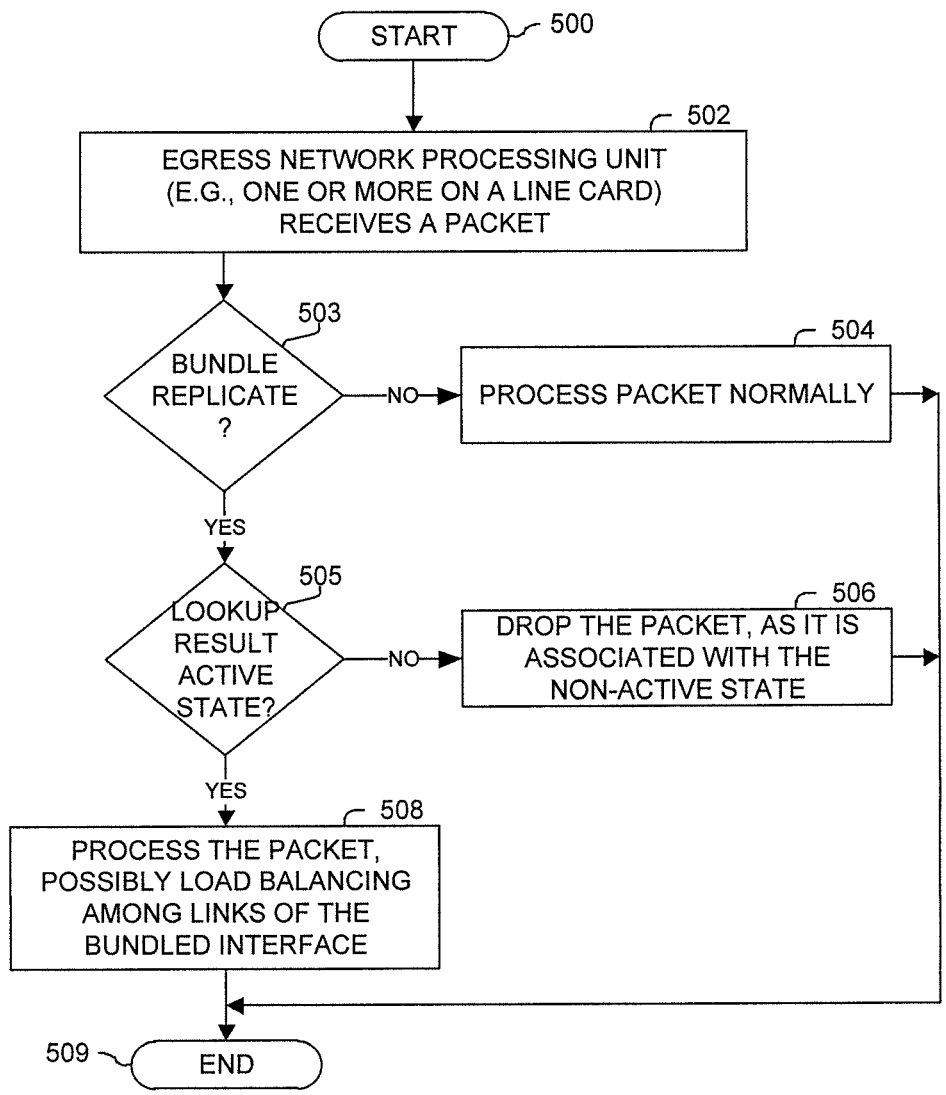
FIG. 5 illustrates a processes configured to be performed, and/or performed, in one embodiment.

FIG. 5 illustrates a processes configured to be performed, and/or performed, in one embodiment. Processing begins with process block 500. In process block 502, an egress network processing unit receives a packet (e.g., from an ingress network processing unit). As determined in process block 503, if the packet is not associated with bundled link interface replication for fast recover, then in process block 504, the packet is processed normally. Otherwise, the packet is associated with bundled link interface replication for fast recover, and as determined in process block 505, if the packet is not associated with the active state, then it is dropped in process block 506; otherwise, it is associated with the active state and is processed in process block 508, and the network processing unit possibly load balances the packet among one or more links of the bundled link interface that the egress network processing unit is associated. Processing of the flow diagram of FIG. 5 is complete as indicated by process block 509.

Figure 6:
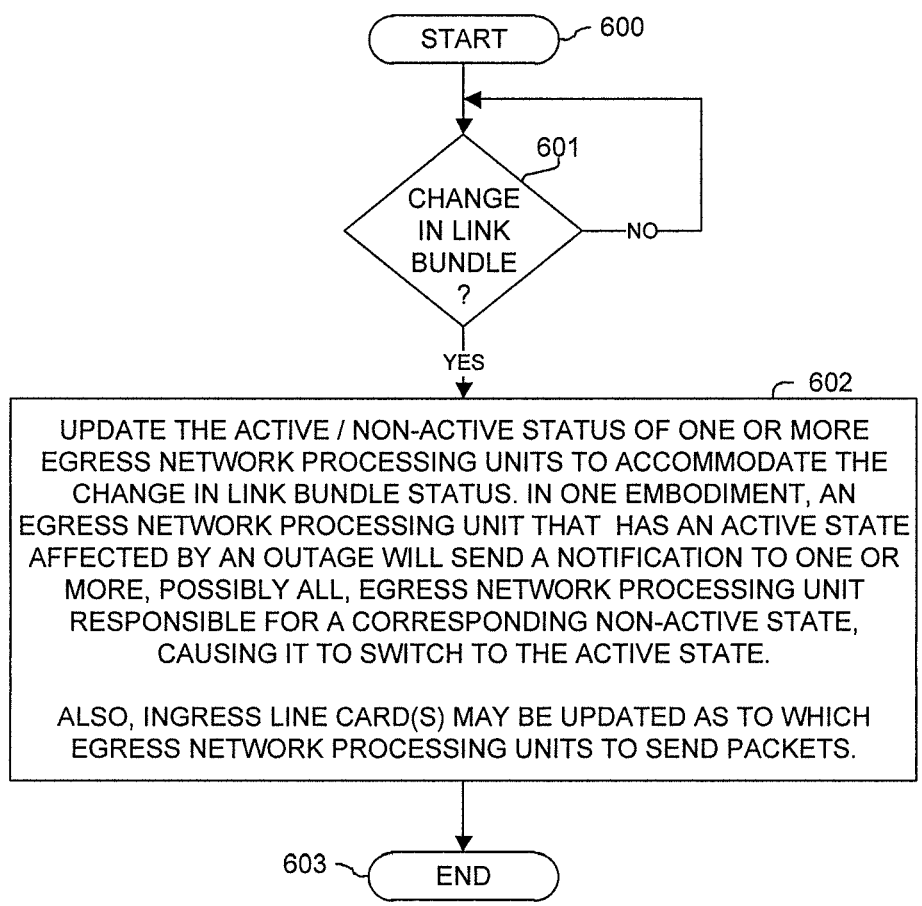
FIG. 6 illustrates a processes configured to be performed, and/or performed, in one embodiment.

FIG. 6 illustrates a processes configured to be performed, and/or performed, in one embodiment. Processing begins with process block 600. Process loops in block 601 as long as there is no change in a link of the bundled link interface that requires an adjustment of an active or non-active state associated with a bundled link interface. When there is such a change, in process block 602, the active/non-active status of one or more egress network processing units is updated to accommodate the change in link bundle status. In one embodiment, an egress network processing unit that has an active state affected by an outage will send a notification to one or more, and possibly all, other egress network processing unit responsible for a corresponding non-active state, causing them/it to switch to the active state.

In one embodiment, one or more ingress line cards may be updated to change their replication so as to adjust to which egress network processing units to send packets. For example, if a line card with an egress network processing unit goes off-line, the packet switching device will adjust the state of corresponding other egress network processing units for those packets that the now off-line egress network processing unit was previously in the active state. Also, one embodiment adjusts the ingress line cards to forward packets destined for the bundled link interface to a different egress network processing unit rather than the now off-line egress network processing unit. Processing of the flow diagram of FIG. 6 is complete as indicated by process block 603.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
in response to determining, by an ingress line card of a physical router including a plurality of egress network processing units, based on a lookup operation using a forwarding data structure on a particular Internet Protocol (IP) packet, that the particular IP packet is to be sent out over a bundled interface of the router from either of two of a plurality of egress network processing units associated with one or more links of a plurality of links with the bundled interface associated with a set of links including the plurality of links: sending the particular IP packet to each of said two of the plurality of egress network processing units;
in response to determining by each particular egress network processing unit of one or more particular egress network processing units of the plurality of egress network processing units that said particular egress network unit is in the non-active state for communicating the particular IP packet from the bundled interface, dropping the particular IP packet; and
in response to determining by a single egress network processing unit of the plurality of egress network processing units that the single egress network processing unit is in the active state for communicating the particular IP packet from the bundled interface, forwarding the particular IP packet from the router over a particular link of the plurality of links of the bundled interface;
wherein the particular IP packet is sent out over a single link of the plurality of links of the bundled interface.

2. The method of claim 1, wherein the plurality of egress network processing units includes at least three egress network processing units; and wherein one or more particular egress network processing units includes at least two of the plurality of egress network processing units.

3. The method of claim 2, comprising: in response to determining that the particular link is not available for communicating packets, the single egress network processing unit providing notification to each of said one or more particular egress network processing units, and in response, each of said one or more particular egress network processing units switching to an active state for communicating packets from the bundled interface.

4. The method of claim 2, comprising: in response to determining that the single egress network processing unit is not available for communicating packets over the bundled interface, the router switches each of said one or more particular egress network processing units to an active state for communicating packets from the bundled interface.

5. The method of claim 1, wherein said determining by each particular egress network processing unit that said particular egress network unit is in the non-active state for communicating the particular IP packet from the bundled interface includes performing a lookup operation on a forwarding data structure resulting in the identification of an entry identifying to drop the particular IP packet.

6. The method of claim 5, wherein at the time of said dropping the particular IP packet: each particular egress network processing unit of said one or more particular egress network processing units is in the active state for communicating other packets from the bundled interface.

7. The method of claim 1, wherein at the time of said dropping the particular IP packet: each particular egress network processing unit of said one or more particular egress network processing units is in the active state for communicating other packets from the bundled interface.

8. The method of claim 1, wherein said determining by the single egress network processing unit that the single egress network processing unit is in the active state for communicating the particular IP packet from the bundled interface includes performing a lookup operation on a forwarding data structure to identify an entry corresponding to the single egress network processing unit in the active state, with the entry identifying to forward the particular IP packet.

9. The method of claim 1, wherein each of the plurality of egress network processing units are located on a different line card of the router.

10. The method of claim 1, wherein the single egress interface is associated with a particular plurality of links of the plurality of links of the bundled interface; and wherein the method includes the single egress interface load balancing packets over the particular plurality of links, which includes the single egress interface selecting the single link of the plurality of links of the bundled interface.

11. The method of claim 1, wherein the particular IP packet is a multicast packet; and wherein the method includes sending the particular IP packet from the router over a communications link that is not associated with the bundled interface.

12. A method, comprising:
in response to determining, by an ingress line card of a single physical router including a plurality of egress network processing units, based on a lookup operation using a forwarding data structure on a particular Internet Protocol (IP) packet, that the particular IP packet is to be sent out over a bundled interface of the router from one of a plurality of egress network processing units associated with one or more links of a plurality of links with the bundled interface associated with a set of links including the plurality of links: sending the particular IP packet to each of the plurality of egress network processing units;
in response to determining by each particular egress network processing unit of one or more particular egress network processing units of the plurality of egress network processing units that said particular egress network unit is in the non-active state for communicating the particular IP packet from the bundled interface, dropping the particular IP packet; and
in response to determining by a single egress network processing unit of the plurality of egress network processing units that the single egress network processing unit is in the active state for communicating the particular IP packet from the bundled interface, forwarding the particular IP packet from the router over a particular link of the plurality of links of the bundled interface;
wherein the particular IP packet is sent out over a single link of the plurality of links of the bundled interface.

13. The method of claim 12, comprising: in response to determining that the particular link is not available for communicating packets, the single egress network processing unit providing notification to one egress network processing unit of said one or more particular egress network processing units, and in response, the one egress network processing unit switching to an active state for communicating packets from the bundled interface.

14. The method of claim 12, comprising: in response to determining that the single egress network processing unit is not available for communicating packets over the bundled interface, the router switching one egress network processing unit of said one or more particular egress network processing units to an active state for communicating packets from the bundled interface.

15. The method of claim 12, wherein at the time of said dropping the particular IP packet: each particular egress network processing unit of said one or more particular egress network processing units is in the active state for communicating other packets from the bundled interface.

16. A packet switching device, comprising:
a router processor;
a first egress line card and a second egress line card, with each of the first and second egress line cards comprising: a plurality of interfaces configured to communicate Internet Protocol (IP) packets including sending IP packets over one or more links of a plurality of links of a bundled interface; memory; and one or more processing elements configured to perform egress line card operations;
an ingress line card comprising: an interface configured to communicate IP packets comprising receiving IP packets including a particular IP packet; memory; and one or more processing elements configured to perform operations, including: in response to performing a lookup operation on the particular IP packet resulting in the determination that the particular IP packet should be sent out over a link of a plurality of links of the bundled interface terminated on at least the first and second egress line cards, sending a copy of the particular IP packet to each of the first and second egress line cards; and
wherein the router processor is configured to exchange routing information with other packet switching devices, to populate one or more routing information bases (RIBs) and to populate one or more forwarding information bases (FIBs) for use in forwarding IP packets on the first egress line card, the second egress line card, and the ingress line card; and
wherein the first egress line card is configured to determine that the particular IP packet is associated with an active state of the bundled interface and in response forwarding the particular IP packet from the first egress line card on a link of the bundled interface; and wherein the second egress line card is configured to determine that the particular IP packet is associated with a non-active state of the bundled interface and in response dropping the particular IP packet;
wherein the packet switching device is a single physical router.

17. The packet switching device of claim 16, wherein said egress line card operations of the first egress line card include performing a lookup operation on a forwarding data structure to determine one of a plurality of states that is associated with a packet, wherein the plurality of states include an active state and a non-active state.

18. The packet switching device of claim 16, wherein said egress line card operations of the first egress line card include: notifying the second egress line card in response to determining one or more links of the plurality of links of the bundled interface associated with the first egress line card are not available for communicating packets over the bundled interface; and wherein said egress line card operations of the second egress line card include: in response to receiving said notification, changing a non-active state where certain packets would have been dropped by the second egress line card to an active state wherein said certain packets would be sent by the second egress line card over one or more links of the plurality of links of the bundled interface.

19. A packet switching device, comprising:
a router processor;
an egress line card, including a first egress network processing unit, a second egress network processing unit, and a plurality of interfaces configured to communicate Internet Protocol (IP) packets including sending IP packets over one or more links of a plurality of links of a bundled interface; wherein each of the first and second egress network processing units include: memory, and one or more processing elements configured to perform egress line card operations;
an ingress line card comprising: an interface configured to communicate IP packets comprising receiving IP packets including a particular IP packet; memory; and one or more processing elements configured to perform operations, including: in response to performing a lookup operation on the particular IP packet resulting in the determination that the particular IP packet should be sent out over a link of a plurality of links of a bundled interface associated at least with the first and second egress network processing units, sending a copy of the particular IP packet to each of the first and second egress network processing units; and
wherein the router processor is configured to exchange routing information with other packet switching devices, to populate one or more routing information bases (RIBs) and to populate one or more forwarding information bases (FIBs) for use in forwarding IP packets by the packet switching device; and
wherein the first egress network processing unit is configured to determine that the particular IP packet is associated with an active state of the bundled interface and in response forwarding the particular IP packet from the packet switching device on a link of the bundled interface; and wherein the second egress network processing unit is configured to determine that the particular IP packet is associated with a non-active state of the bundled interface and in response dropping the particular IP packet;
wherein the packet switching device is a single physical router.

20. The packet switching device of claim 19, wherein said egress line card operations of the first egress network processing unit include: notifying the second egress network processing unit in response to determining one or more links of the plurality of links of the bundled interface associated with the first egress network processing unit are not available for communicating packets over the bundled interface; and wherein said egress line card operations of the second egress network processing unit include: in response to receiving said notification, changing a non-active state where certain packets would have been dropped by the second egress network processing unit to an active state wherein said certain packets would be sent by the second egress network processing unit over one or more links of the plurality of links of the bundled interface.

* * * * *